Dec. 20, 1960     A. W. TONDREAU     2,964,995
TRAVELLING MATTE OPTICAL AND CONTACT PRINTER
Filed Dec. 30, 1957     8 Sheets-Sheet 2

INVENTOR.
Albert W. Tondreau

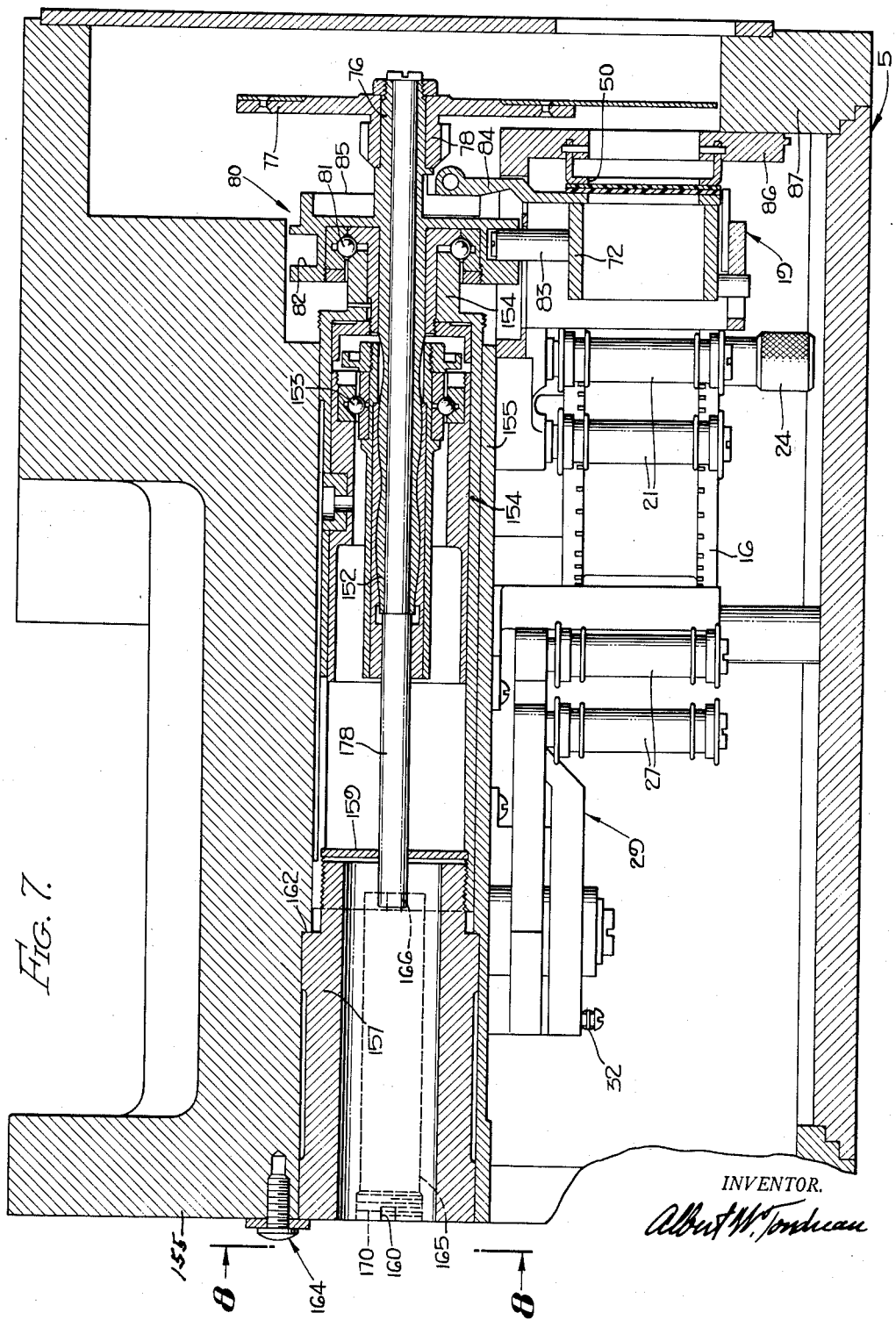

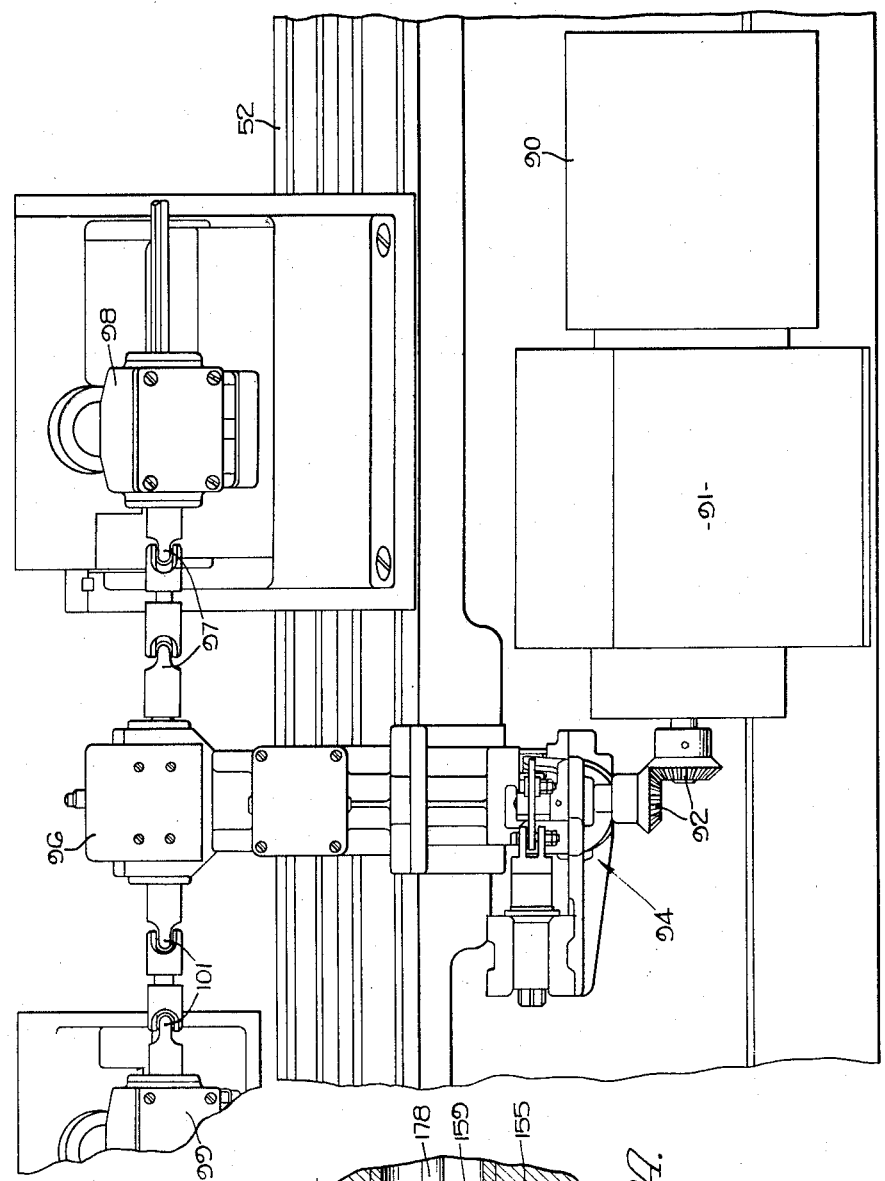

Dec. 20, 1960  A. W. TONDREAU  2,964,995
TRAVELLING MATTE OPTICAL AND CONTACT PRINTER
Filed Dec. 30, 1957  8 Sheets-Sheet 7

INVENTOR.
Albert W. Tondreau

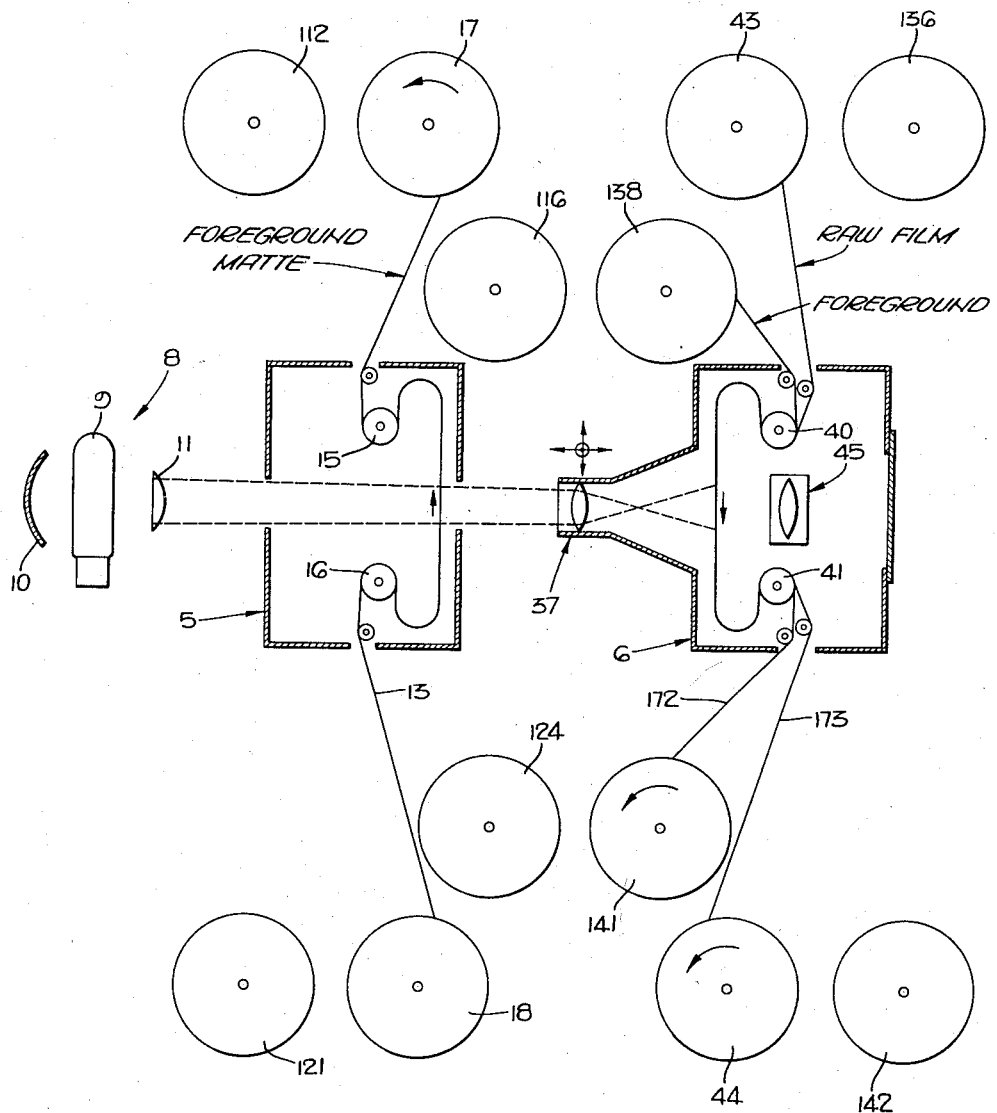

United States Patent Office 2,964,995
Patented Dec. 20, 1960

2,964,995

TRAVELLING MATTE OPTICAL AND CONTACT PRINTER

Albert W. Tondreau, Los Angeles, Calif., assignor to Warner Bros. Pictures, Inc., Burbank, Calif., a corporation of Delaware Filed Dec. 30, 1957, Ser. No. 705,903

5 Claims. (Cl. 88—24)

This invention relates to the production of motion pictures and particularly to a travelling matte contact and optical printer combination for both black-and-white and color motion pictures.

The travelling matte process of combining foreground and background image components on films is well known, reference being made to my Patent No. 2,651,233, of September 8, 1953, which discloses and claims a method of obtaining foreground and background mattes by the use of a divided combination of ultra-violet light and visible light. After these mattes are produced, they are combined as explained hereinafter. In combining a foreground image with a travelling matte image, it is necessary that accurate registration be obtained and maintained at all times. It is well known that film having the images thereon shrinks over a period of time, which will vary the size of one image outline with respect to another if each film has shrunk a different amount. Therefore, to accurately combine picture components using mattes, the outlines of the mattes must be made to coincide during the printing operation. This matching is particularly important in printing color film where it is necessary for film to be passed through a printer six times to completely combine the foreground and background components. That is, the foreground image is impressed on the raw film stock through color separation negatives with cyan, yellow, and magenta filters and one matte. After this has been accomplished, the three color separation negatives of the background are impressed on the raw stock through the filters and the other matte. It is obvious, therefore, that particularly accurate registration must be had in each of the six times that the films are passed through the printer, inasmuch as each film may have a different amount of shrinkage.

The present invention provides a printer which has its elements so arranged together with optical and mechanical adjustments to insure the accurate registration of mattes with the foreground and background picture components. Accurate adjustments to insure registration are obtained by projecting the foreground matte on the background matte and projecting the two images to a screen. Optically, one image may be enlarged or contracted with respect to the other; mechanically, the projector image may be rotated, and, mechanically, the camera image may be adjusted along its optical axis transversely and vertically. Thus, with both optical and mechanical adjustments, the outlines of the picture and the matte may be accurately registered for perfect combination, the tolerances being in the neighborhood of ¼ of ⅒ of one thousandths.

The principal object of the invention, therefore, is to facilitate the production of motion pictures with travelling mattes.

Another object of the invention is to provide an improved combination optical and contact printer using travelling mattes for motion picture production.

A further object of the invention is to provide an improved combination optical and contact printer using travelling mattes in which all necessary optical and mechanical adjustments are provided to obtain accurate registration at all times.

A better understanding of this invention may be had from the following detailed description when read in connection with the accompanying drawings, in which:

Fig. 7 is a cross-sectional view taken along the line 7—7 of Fig. 5.

Fig. 8 is a partial end view of the aperture pressure adjusting mechanism.

Fig. 8A is a cross-sectional view of the aperture pressure adjusting mechanism taken along the 8A—8A of Fig. 8.

Fig. 9 is a partial view of the drive mechanism for the printer taken along the line 9—9 of Fig. 2.

Fig. 12 is a diagrammatic view showing one printing step.

Figure 5:
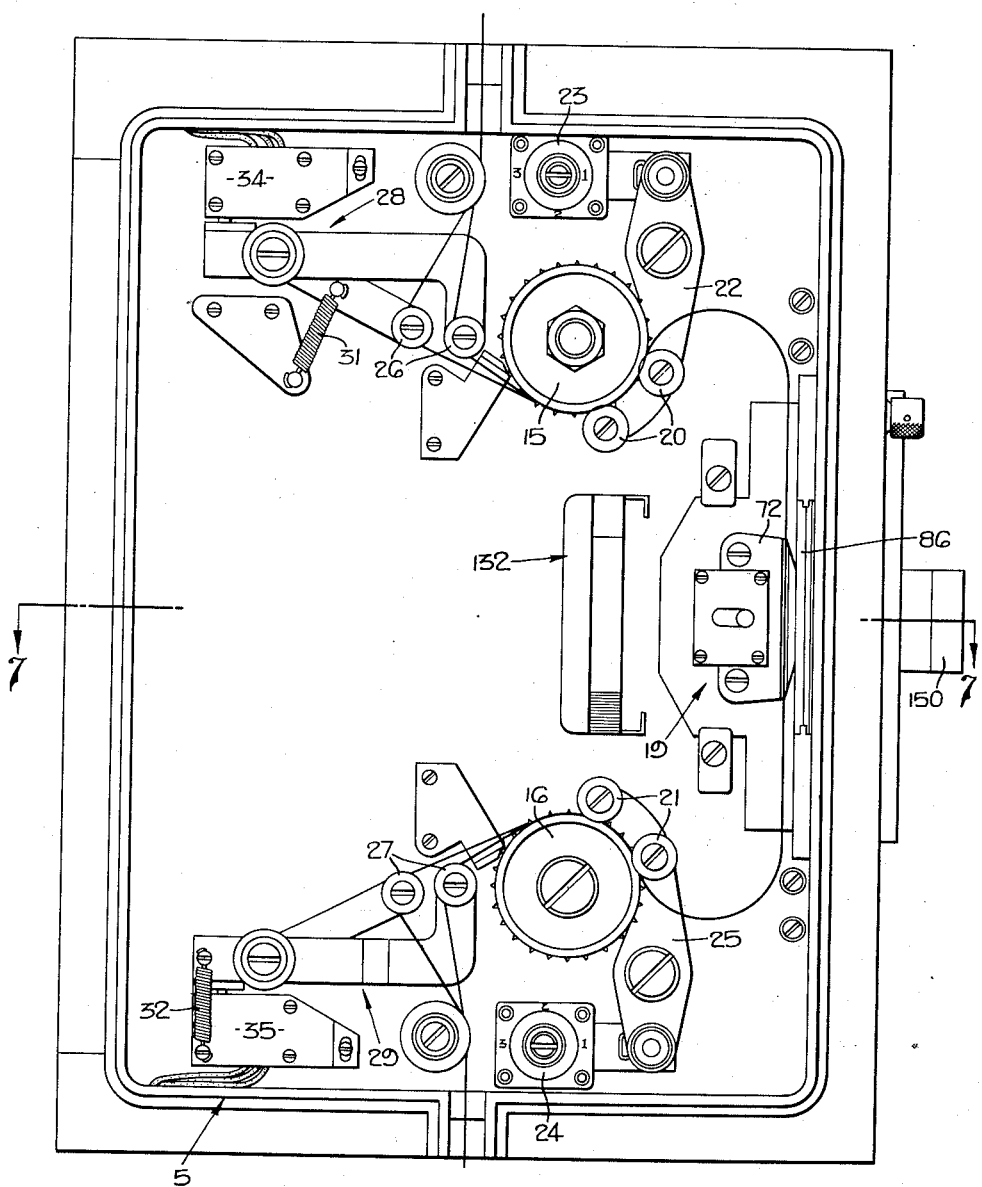
Fig. 5 is an enlarged view of the projector mechanism.
Figure 10:
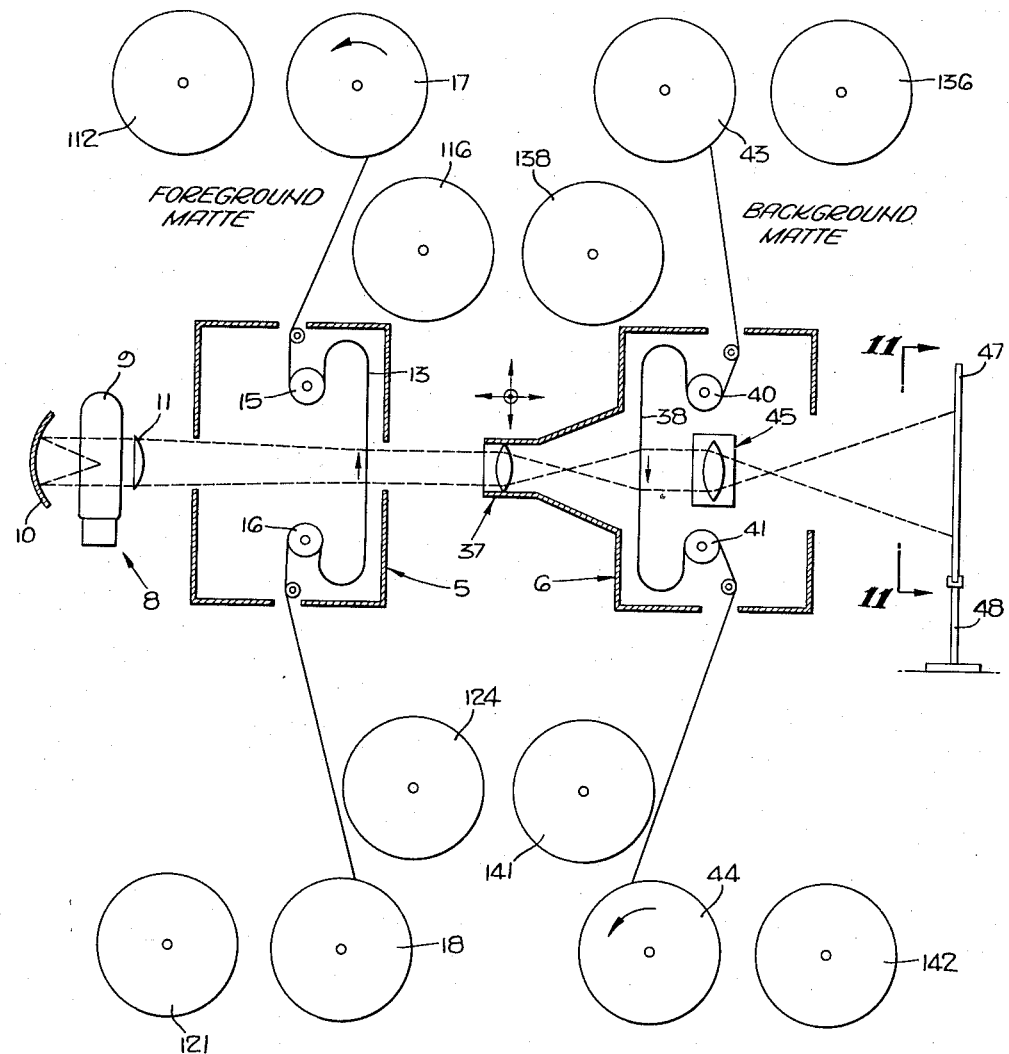
Fig. 10 is a diagrammatic view of the optical printer showing the method of adjusting for registration of the matte outlines.

Referring, now, to the drawings, in which the same reference numerals identify like elements, and particularly to Fig. 10, a projector casing 5 is diagrammatically shown positioned opposite a camera casing 6. A light source shown generally at 8 includes a lamp 9, a reflector 10, and a projection lens 11. Light is projected through the projector 5 in which is a film 13 illustrated as having a foreground matte thereon. This film is advanced upwardly, as shown by the arrow, by the film advancing mechanism, including sprockets 15 and 16, reels 17 and 18, and an intermittent mechanism shown generally at 19 (see Fig. 5). Since more than one film may be advanced through the projector at different times, provision is made for adjusting the pad rollers 20 and 21 on their respective sprockets 15 and 16. This is accomplished by cams which operate on respective arms 22 and 25 of the pad rollers and which are adjustable by knobs 23 and 24. When two or more films are used, they are guided around rollers 26 and 27 mounted on mechanisms 28 and 29 for the purpose of automatically de-energizing all the motors in the event of film breakage. These mechanisms hold the film against the tension of springs 31 and 32 which contract upon film breakage to operate motor control switches in housings 34 and 35.

Referring again to Fig. 10, the light through the film 13 is projected by an adjustable optical copying unit 37 to a film 38 illustrated as having a background matte thereon, and which is advanced downwardly, as shown by the arrow, by film advancing mechanism including sprockets 40 and 41 of the same type as the sprockets 15 and 16 in the projector. The camera also has pad roller adjusting mechanisms to provide for the advancement or more than one film and has film breakage controls similar to the projector 5 as above described and shown in Fig. 5. The film 38 is supplied from a reel 43 and taken up by a reel 44. The mattes on the films 13 and 38 are projected by an optical unit 45 to a screen 47 mounted on a support 48.

Figure 11:
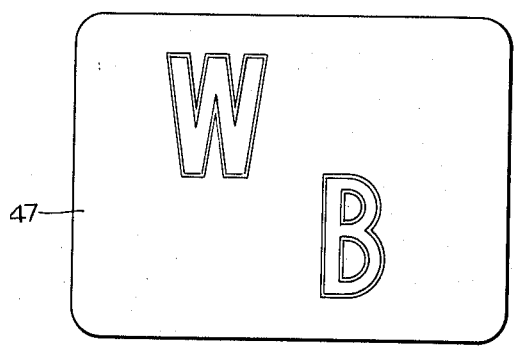
Fig. 11 is a plan view of the projection screen.

To illustrate the registration desired, reference is made to Fig. 11 wherein the letters "WB" are shown in double outline. When a travelling matte on film 13 is projected to the matte on film 38, they usually do not accurately register because of a different amount of shrinkage of each film. Thus, two outlines are obtained as shown in Fig. 11. This will be observed as a line of light on screen 47 since both mattes are complements of one another. It is necessary that the outlines be in accurate registration; that is, coincide, so that in the final negative or positive there will be no indication of any separation between the foreground and background component outlines. This accurate registration is obtained by providing several precision adjustments, such as an adjustment of the optical unit 37, an adjustment of the projector aperture 50 (see Fig. 3) by rotating it about its center, and vertical and horizontal adjustments of the film 38. With these adjustments, perfect registration is obtainable and maintainable by the mechanisms to be described, it being also possible to adjust the projector and camera units toward and away from each other.

Figure 1:
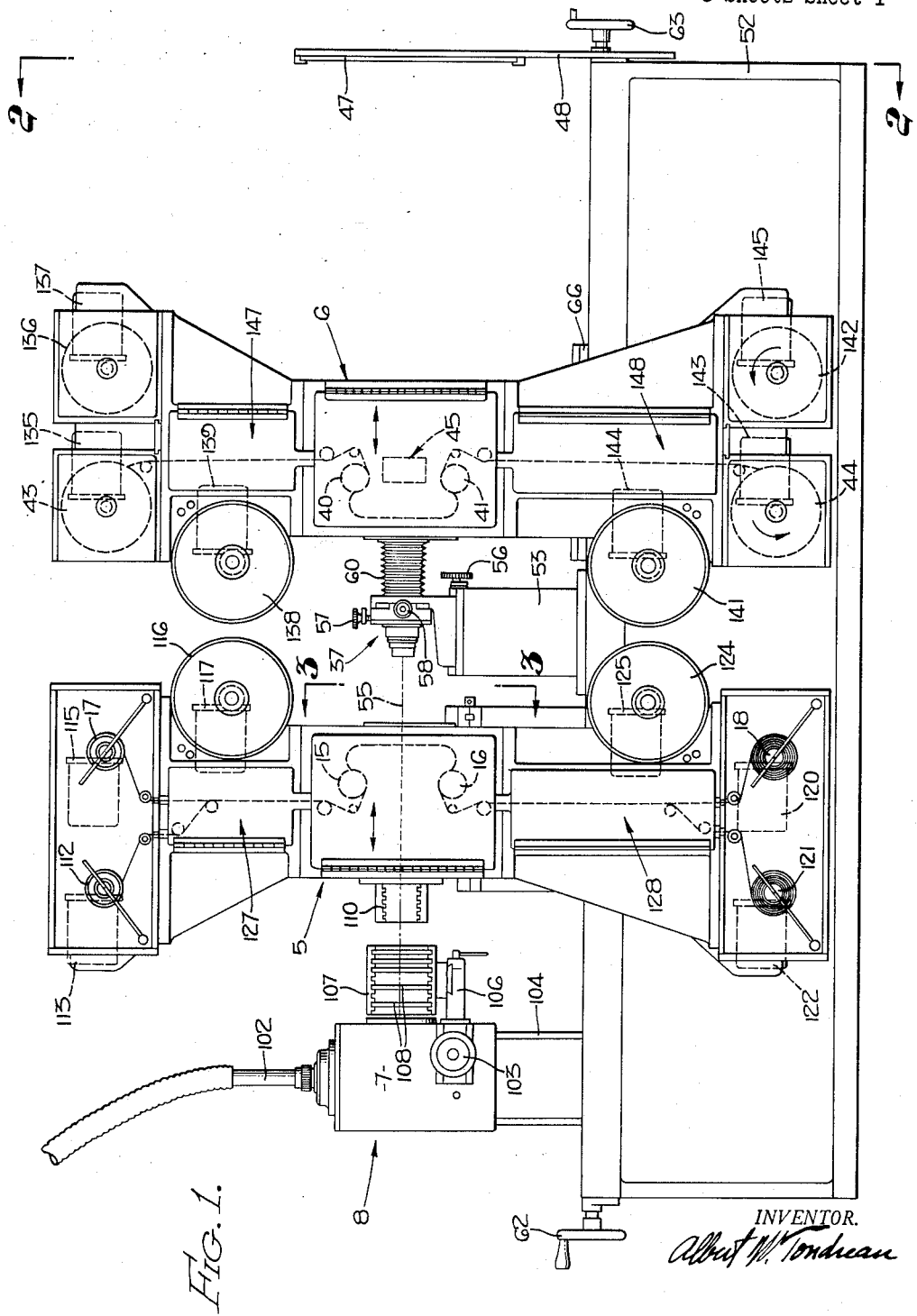
Fig. 1 is an elevational view of a combination optical and contact printer embodying the invention.

Referring, now, to Fig. 1, mounted on the upper section of a rectangular base 52 is the projector unit 5 and the camera unit 6, it being understood that these units may be reversed in function since the film transport mechanisms are the same in each. On the base 52 between the units 5 and 6 is a fixed support 53 on which is mounted a one-to-one optical copying unit 37. The unit 37 is provided with an adjustment along the optical axis 55 by a screw and knob combination 56, is provided with a vertical adjustment by a screw and knob combination 57, and is provided with a transverse adjustment by a screw and knob combination 58, the bellows 60 permitting the unit 37 to be so adjusted.

Figure 6:
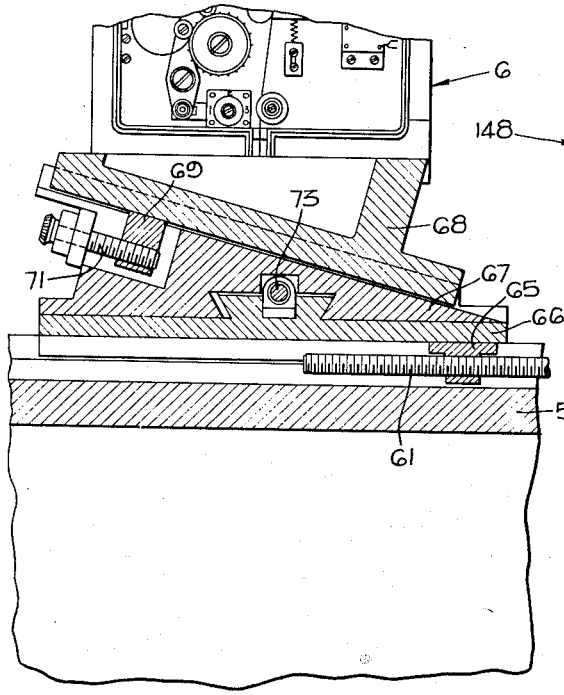
Fig. 6 is a cross-sectional view taken along the line 6—6 of Fig. 2.

Both the projector and camera units are movable along the base 52 by screws of the type shown at 61 in Fig. 6, this particular screw, being for the adjustment of the camera unit 6. The screw for projector 5 is adjustable by a hand wheel 62 while the screw for the camera 6 is adjustable by a hand wheel 63. Thus, the units 5 and 6 are movable toward and away from each other along the optical axis 55. However, camera 6 may be moved vertically and laterally as well.

Figure 2:
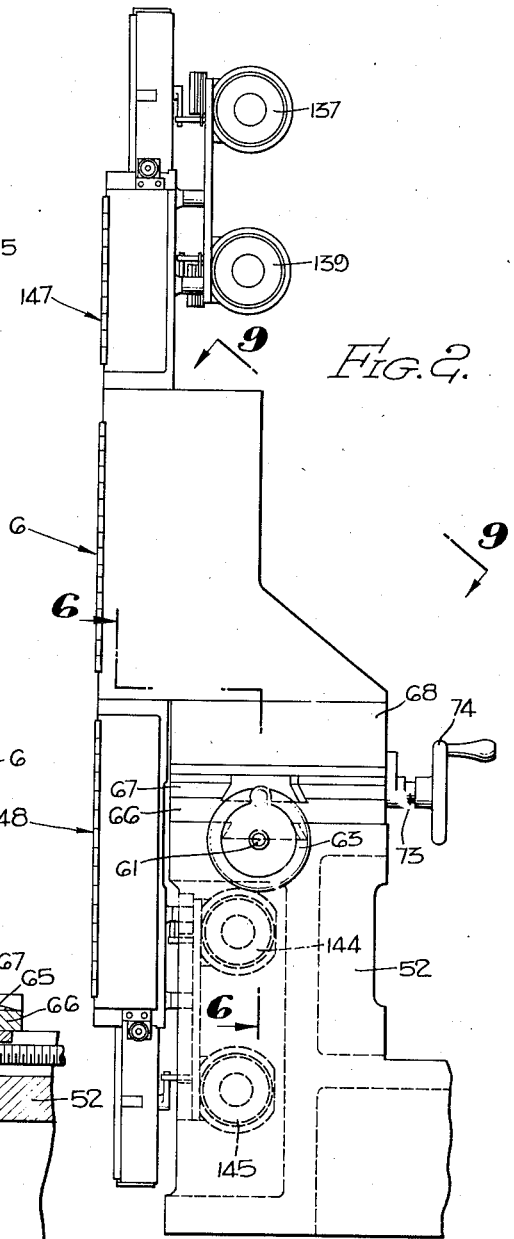
Fig. 2 is an end view of the printer shown in Fig. 1 and taken along the line 2—2 of Fig. 1.

The camera 6 has its screw 61 threaded in a lug 65 connected to a dovetail base plate 66. Mounted on the base plate 66 is a triangular mounting block 67. Slidable on the sloping side of the block 67 is a camera supporting bracket 68 to which is attached a lug 69. Threaded through the lug 69 is an adjusting screw 71. Rotation of the screw 71 will, therefore, raise and lower the camera 6. The camera 6 may also be adjusted transversely of its optical axis by a screw 73 having a hand wheel 74 on the end thereof (see Fig. 2). This adjustment will, therefore, move the camera 6 horizontally, while the adjustment of screw 71 will adjust the camera vertically and the screw 61 will move the camera along its optical axis.

Figure 3:
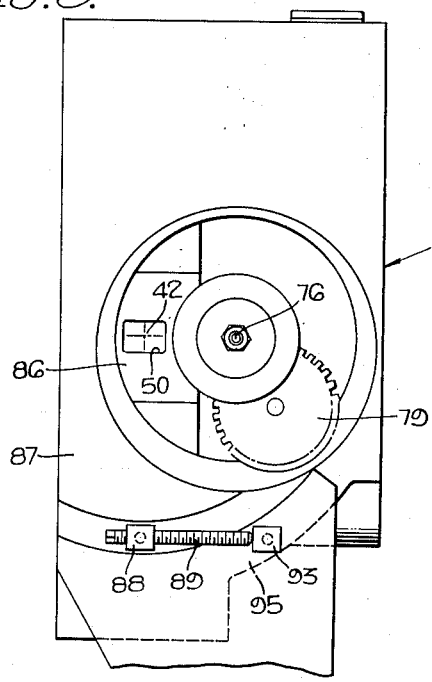
Fig. 3 is an end view of the adjustment mechanism for the projector aperture and taken along the line 3—3 of Fig. 1.

Referring, now, to Figs. 3 and 7 showing the aperture portion and pulldown mechanism of the projector 5, a drive shaft 76 has a shutter 77 mounted thereon and rotatable therewith, the shaft being rotated by a gear 78 in mesh with a drive gear 79 (see Fig. 3). The shaft 76 has attached thereto an in-and-out and up-and-down cam unit 80 rotatable on bearing 81, the bearing 81 being mounted on sleeve 154. In the serpentine groove 82 is the in-and-out claw drive pin 83, while the up-and-down motion is transferred to the claw by arm 84 from cam 85. The pressure and claw mechanism is shown at 72. This is a standard intermittent pulldown mechanism and a similar mechanism is in the camera 6.

One of the important adjustments is the rotatable adjustment of the film in the aperture 50, two films being shown therein in Fig. 7. This adjustment is obtained by mounting the pulldown unit 80 and aperture plate 86 on a plate 87 to which a lug 88 is fastened (see Fig. 3). the lug being threaded with a rod 89, the end of the rod abutting a stop block 93 attached to the casting 95. The plate has a circular track, the center of curvature being at the center 42 of the aperture 50. Thus, the frame of film in the aperture may be rotatably adjusted if necessary to bring about coincidence of matte outlines.

There is thus provided the several adjustments mentioned in connection with the description of Fig. 10, whereby accurate registration of the foreground matte, background matte, and foreground and background components is obtained to insure the proper and accurate masking of the foreground and background components during the printing operations.

Referring, now, to Fig. 9, a drive system for the projector is shown, a motor 90 being connected to a variable gear box 91. The drive shaft from the gear box 91 is coupled by miter gears 92 to a stop motion unit 94 which permits the intermittent mechanisms in the projector and camera to be advanced one frame at a time if desired. The stop motion unit 94 is connected to a gear box 96 which permits the two projectors to be driven in either direction, the gear box also having a neutral position. The over-all gear box 96 is connected through universal joints 97 and shafts to another gear box 98 which permits the projector to be run in either direction or stopped. Another gear box 99, similar to gear box 98, is connected by universal joints 101 and shafts to the over-all gear box 96. The gear box 99 permits the camera 6 to be run in either direction and stopped.

Figure 4:
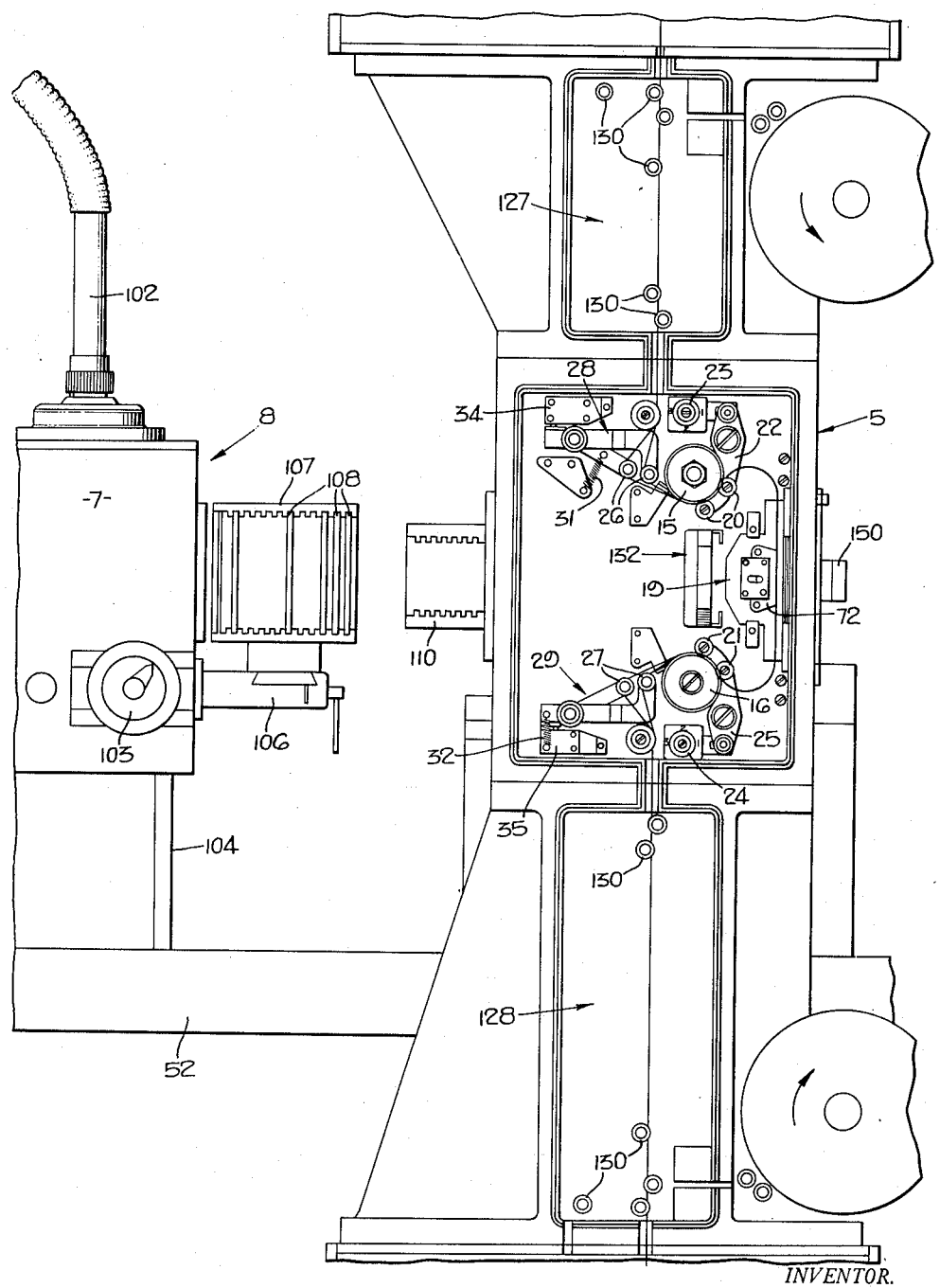
Fig. 4 is a side elevational view of the projector mechanism.

Referring to Figs. 1 and 4, the light supply 8 includes the lamp 9 in a housing 7 and an intensity control 103 mounted on a standard 104 on the base 52. Pipe 102 is connected to a vacuum line to cool the lamp. Adjustably mounted on a support 106 is a filter holder 107 in which the various filters, such as cyan, yellow, and magenta, are positioned as shown at 108. A filter holder 110 is provided for additional hue and density control. As shown in Fig. 1, three films may be advanced in either direction, a reel 112 being under control of a motor 113, the reel 17 being under control of a motor 115, and a reel 116 being under control of a motor 117. At the lower end of the unit, reel 18 is under control of a motor 120, and reel 121 is under control of a motor 122, and a reel 124 is under control of a motor 125. Positioned above and below the intermittent mechanism of the projector 5 are compartments 127 and 128, respectively, through which one or more films may be guided by the various guide rollers 130. As mentioned above, the pulldown mechanism unit 19 is a well known standard type which is used in both projector and camera with an adjustment to be described hereinafter. Positioned between the lamphouse and film in the projector is a field corrected lens unit 132 of any standard type. A masking unit is shown at 150.

The camera unit is also provided with three upper and three lower reels for advancing one, two, or three films simultaneously in either direction. That is, reel 43 is connected to motor 135, reel 136 is connected to motor 137, and reel 138 is connected to motor 139. At the lower end of the camera unit are three reels, 44, 141, and 142, having respective driving motors 143, 144, and 145. Also positioned above and below the camera intermittent mechanism are compartments 147 and 148 in which are film guiding rollers such as shown at 130 in compartments 127 and 128. This arrangement of reels, film transport mechanisms, and other projector and camera elements, permits any print on a particular roll of film to be positioned at respective apertures without running any undesired portion of the film roll through either camera or projector. This feature saves much time and film.

Referring, now, to Figs. 8 and 8A, and again to Fig. 7, the adjustment for maintaining the desired tension of friction at the aperture plate for one, two, or three films is shown. The twisted shaft 152 is driven by gear 78, this shaft being used for dissolves and is part of a standard pulldown mechanism. The shaft 152 rotates in bearing 153, the bearing being mounted on sleeve 154 which is positioned in an outer sleeve casting 155. Threaded into the end of sleeve 154 is a cylinder 157 for adjusting the axial position of sleeve 154, the end of a rod 178 passing through a centering disc 159.

In Fig. 8, the end of cylinder 157 is shown with spanner wrench notches 160, the indicia 156 being used to indicate the amount of rotation of cylinder 157, rotation of this cylinder moving sleeve 154 axially, which moves the entire pulldown and aperture pressure plate mechanism toward and away from the fixed aperture plate. Thus, the gate can pass one or more films therethrough with the same amount of tension or friction between films and plates.

The cylinder 157 is held in a fixed axial position during rotation by a shoulder 162 against casting 155 and by a washer and screw combination 164. To always provide a thrust on the sleeve 154, a pin 165 having a lug 166 is biased by a spring 168 held in position by a screw 170, the lug abutting the end of sleeve 154. A similar construction is in the camera.

In Fig. 12, one printing step is illustrated diagrammatically after the projection aperture and other optical and mechanical adjustments have been made. The foreground matte film 13 is shown in projector 5 as in Fig. 10, but in camera 6 are two films in contact with one another. Film 173 is raw stock which may be negative stock if a negative is desired or positive stock if a positive is desired. Thus, this printing step will result in obtaining the foreground component while the background component is masked out by the matte 13. If only black-and-white pictures are being printed, the next step is to use the background picture film at 172 and the background matte at 13.

In color printing, the two mattes are still used but the film 172 is one of the color separation negatives which is used with its proper color filter, such as cyan, yellow, or magenta. The raw stock, therefore, must be passed through the printer six times with different combinations of films and filters, tests being made by projection of the different films from time to time to insure registration for the different combinations.

I claim:

1. A film printer using travelling mattes and foreground and background component films comprising a projector for one or more films, a light source for said projector, a camera for at least one film at certain times and for at least two films in contact with one another at other times and having its optical axis adapted to be aligned with the optical axis of said projector, an optical unit for focussing the images on said projector films onto said camera films, an observation screen aligned with the optical axes of said projector and camera, a second optical unit for projecting the images on certain of said films in said projector and camera for observation on said screen, means for rotating the frame of film being projected by said projector, means for adjusting the optical axis of said first-mentioned optical unit with the optical axis of said projector, and means for adjusting the poistion of said films in said camera with respect to certain films in said projector along three axes mutually perpendicular to one another, the position of the projected images on said screen indicating the amount of the necessary adjustments.

2. A film printer in accordance with claim 1 in which gates for said projector and camera films are provided with axially movable means for adjusting the tension in each of said gates to be equal for any number of films passing therethrough, said rotating means being adapted to rotate said projector gate.

3. A film printer in accordance with claim 1 in which said last-mentioned means includes an inclined plane support for said camera and means for moving said camera on said support, movement of said camera on said support moving said camera vertically.

4. A film printer in accordance with claim 1 in which said rotating means for the frames of said projector films being projected includes a pulldown and aperture plate unit, an arcuate support for said unit, the center of curvature of said support coinciding with the center of the aperture in said plate unit, and means for rotating said support.

5. A film printer in accordance with claim 3 in which said last-mentioned means also includes a base, a plate mounted on said base adapted to be moved parallel with the optical axes of said projector and camera, said inclined plane support being mounted on said plate and movable thereon to move said support at a right angle to the direction of movement of said plate, and screw means for moving said plate and inclined plane suppport.

References Cited in the file of this patent

UNITED STATES PATENTS

| | | |
|---|---|---|
| 1,580,114 | Brewster | Apr. 13, 1926 |
| 1,598,956 | Capstaff | Sept. 7, 1926 |
| 1,959,498 | Planskoy | May 22, 1934 |
| 2,207,103 | O'Grady | July 9, 1940 |
| 2,249,033 | O'Grady | July 15, 1941 |
| 2,622,475 | Tondreau | Dec. 23, 1952 |